(12) United States Patent
Schmidt

(10) Patent No.: US 12,120,475 B2
(45) Date of Patent: Oct. 15, 2024

(54) REMOTE SENSOR AND METHOD FOR COMMUNICATION WITH A REMOTE SENSOR

(71) Applicant: EnOcean GmbH, Oberhaching (DE)

(72) Inventor: Frank Schmidt, Munich (DE)

(73) Assignee: EnOcean GmbH, Oberhaching (DE)

( * ) Notice: Subject to any disclaimer, the term of this patent is extended or adjusted under 35 U.S.C. 154(b) by 233 days.

(21) Appl. No.: 17/642,486

(22) PCT Filed: Sep. 10, 2020

(86) PCT No.: PCT/EP2020/075372
§ 371 (c)(1),
(2) Date: Mar. 11, 2022

(87) PCT Pub. No.: WO2021/052864
PCT Pub. Date: Mar. 25, 2021

(65) Prior Publication Data
US 2022/0312086 A1    Sep. 29, 2022

(30) Foreign Application Priority Data
Sep. 16, 2019    (DE) .......................... 102019124833.7

(51) Int. Cl.
*H04B 5/79*    (2024.01)
*H04B 5/22*    (2024.01)
(Continued)

(52) U.S. Cl.
CPC ................. *H04Q 9/00* (2013.01); *H04B 5/22* (2024.01); *H04B 5/24* (2024.01); *H04B 5/79* (2024.01);
(Continued)

(58) Field of Classification Search
CPC ................. H04Q 9/00; H04Q 2209/86; H04Q 2209/886; H04Q 2209/43; H04Q 2209/47;
(Continued)

(56) References Cited

U.S. PATENT DOCUMENTS 9,820,323 B1    11/2017 Young
9,871,387 B1 *   1/2018 Bell ..................... G06V 40/103
(Continued)

FOREIGN PATENT DOCUMENTS

CN    102480164 A    5/2012
CN    102782735 A    11/2012
(Continued)

OTHER PUBLICATIONS

Examination Report in Chinese Patent Application No. 20208007730.5, dated Aug. 9, 2023, in Chinese (13 pages).
(Continued)

*Primary Examiner* — Andrew Wendell
(74) *Attorney, Agent, or Firm* — Nixon Peabody LLP

(57) ABSTRACT

A remote sensor including a first wireless interface for sending out data. The remote sensor has a second wireless interface arranged separate from the first wireless interface. The second wireless interface is configured for the wireless transmission of information between the remote sensor and an external device. The invention also relates to a method for communication between a remote sensor and an external device. The method involves creating a communication link between a wireless interface of the remote sensor and a wireless interface of the external device, as well as transmitting information between the remote sensor and the external device by the established communication link. This
(Continued)

Figure 1:
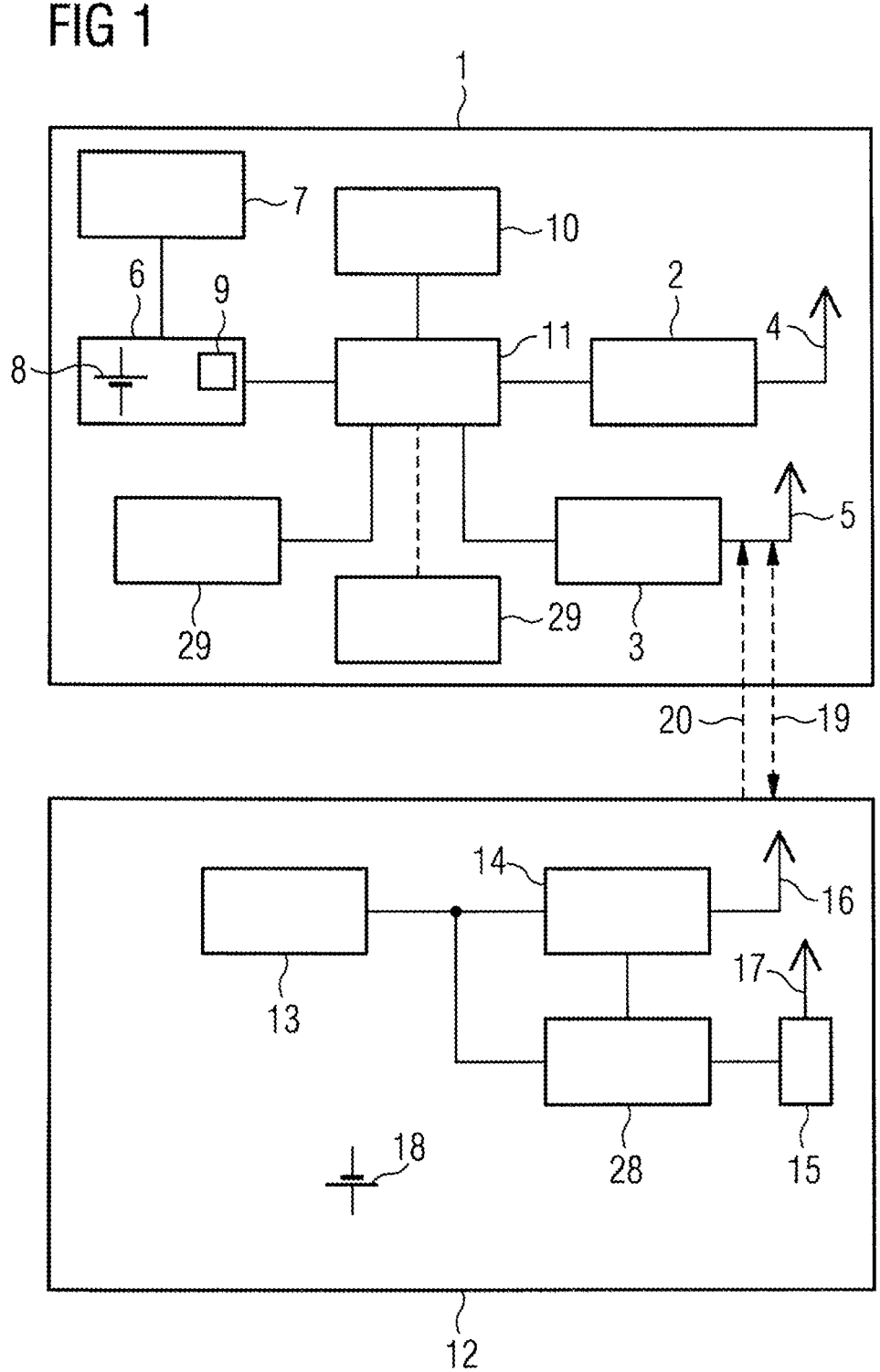

allows for simple configuration or maintenance of the remote sensor by the external device according to the exchanged information.

15 Claims, 4 Drawing Sheets

(51) Int. Cl.
*H04B 5/24* (2024.01)
*H04B 10/114* (2013.01)
*H04Q 9/00* (2006.01)
*H04W 4/38* (2018.01)

(52) U.S. Cl.
CPC ..... *H04B 10/1143* (2013.01); *H04Q 2209/86* (2013.01); *H04Q 2209/886* (2013.01)

(58) Field of Classification Search
CPC ............ G08C 2201/11; G08C 2201/20; G08C 2201/21; G08C 2201/93; G08C 17/02; H04B 5/22; H04B 5/24; H04B 5/79; H04B 10/1143; H04B 5/48; H04W 4/80; H04W 4/38
See application file for complete search history.

(56) References Cited

U.S. PATENT DOCUMENTS

| | | | |
|---|---|---|---|
| 2004/0059585 A1 | 3/2004 | Villicana | |
| 2004/0267501 A1* | 12/2004 | Freed | H02J 50/005 702/184 |
| 2009/0102633 A1 | 4/2009 | Ebinuma | |
| 2011/0287757 A1 | 11/2011 | Nykoluk | |
| 2012/0197558 A1 | 8/2012 | Henig | |
| 2014/0265568 A1 | 9/2014 | Crafts | |
| 2015/0044966 A1 | 2/2015 | Shultz | |
| 2016/0294446 A1 | 10/2016 | Rumler | |
| 2016/0323825 A1 | 11/2016 | Yamaji | |
| 2017/0202037 A1 | 7/2017 | Hong | |
| 2017/0279275 A1* | 9/2017 | Yamamoto | H02J 7/007182 |
| 2018/0316988 A1* | 11/2018 | Gotou | H02J 7/005 |
| 2019/0045280 A1* | 2/2019 | Bambrick | H04Q 9/00 |
| 2019/0074676 A1 | 3/2019 | Beghelli | |
| 2019/0116088 A1 | 4/2019 | Mueglitz | |
| 2019/0132655 A1* | 5/2019 | Seo | G01N 33/18 |
| 2019/0174210 A1 | 6/2019 | Robl | |
| 2019/0188548 A1 | 6/2019 | Casagrande | |
| 2019/0304290 A1* | 10/2019 | Atkins | G08B 25/003 |
| 2019/0349769 A1 | 11/2019 | Palin | |
| 2020/0083744 A1* | 3/2020 | Vannucci | H02J 50/10 |
| 2020/0281467 A1* | 9/2020 | Biederman | H01Q 11/08 |
| 2022/0312086 A1 | 9/2022 | Schmidt | |

FOREIGN PATENT DOCUMENTS

| | | |
|---|---|---|
| CN | 202534124 U | 11/2012 |
| CN | 204304495 U | 4/2015 |
| CN | 105122946 A | 12/2015 |
| CN | 105676759 A | 6/2016 |
| CN | 105721426 A | 6/2016 |
| CN | 106094739 A | 11/2016 |
| CN | 106534180 A | 3/2017 |
| CN | 106556766 A | 4/2017 |
| CN | 108464021 A | 8/2018 |
| CN | 109479017 A | 3/2019 |
| CN | 109644327 A | 4/2019 |
| CN | 109934030 A | 6/2019 |
| CN | 109983791 A | 7/2019 |
| CN | 110192398 A | 8/2019 |
| DE | 102012103911 A1 | 11/2013 |
| JP | 2006-015884 A | 1/2006 |
| JP | 2007-272827 A | 10/2007 |
| JP | 2012-064181 A | 3/2012 |
| JP | 2013-003078 A | 1/2013 |
| JP | 2015-192382 A | 11/2015 |
| WO | WO 02/013039 A1 | 2/2002 |
| WO | WO 2017/218300 A1 | 12/2017 |

OTHER PUBLICATIONS

International Search Report and Written Opinion of International Searching Authority corresponding to International Patent Application No. PCT/EP2020/075372, with English translation of the Search Report, mailed Oct. 26, 2020 (10 pages).
Examination Report in Korean Patent Application No. 10-2022-7012627, dated Aug. 18, 2023, in Korean (5 pages).
Examination Report in Japanese Patent Application No. 2022-516411, dated May 16, 2023, in Japanese (6 pages).
Examination Report in Chinese Patent Application No. 20208007730.5, dated Jan. 6, 2024, in Chinese (10 pages).
Examination Report in Japanese Patent Application No. 2022-516411, dated Dec. 5, 2023, in Japanese (4 pages).
Examination Report in Chinese Patent Application No. 20208007730.5, dated Jul. 25, 2024, in Chinese (18 pages).

* cited by examiner

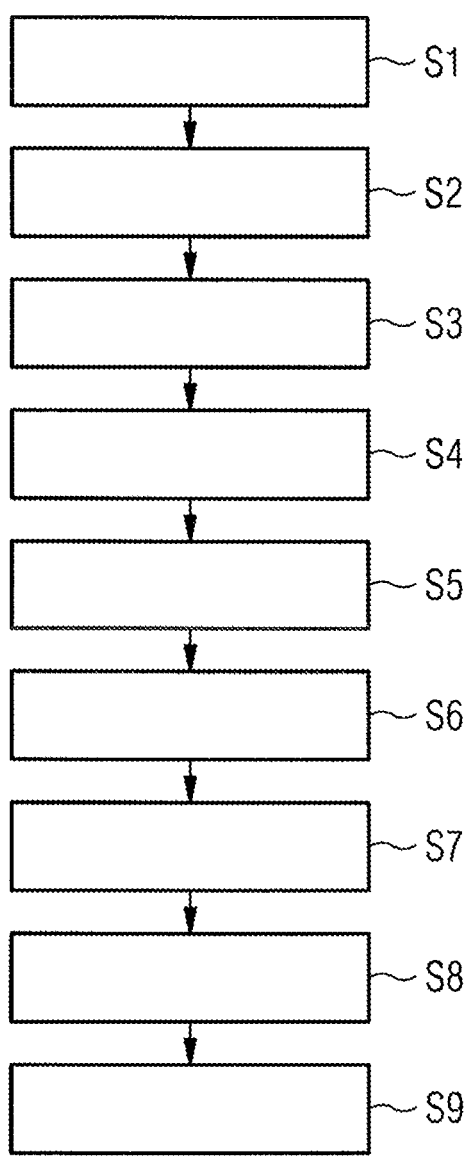

REMOTE SENSOR AND METHOD FOR COMMUNICATION WITH A REMOTE SENSOR

CROSS-REFERENCE TO RELATED APPLICATIONS

This application is a U.S. National Stage of International Application No. PCT/EP2020/075372, filed Sep. 10, 2020, which claims the benefit of German Patent Application No. 102019124833.7, filed Sep. 16, 2019, both of which are incorporated herein by reference in their entireties.

The invention relates to a remote sensor. Furthermore the invention relates to a method for communication with a remote sensor.

Remote sensors transmit data periodically or controlled by measured values by radio over predetermined distances (typically less than 200 meters range inside buildings and less than 20 km range outside buildings) to one or more receivers, such as gateways, actuators, receiving devices, devices, systems or combinations thereof.

Such remote sensors include, in particular, remote sensors that collect and transmit data from the immediate or nearby environment. Examples of measurement parameters recorded by such remote sensors are temperature, humidity, gas concentrations, distance and position of objects to reference points, accelerations, thermal radiation or illuminance.

The known remote sensors, when placed on the market, have a defined range of functions that cannot be modified without significant effort and special technology (e. g. wired reprogramming or hardware modification). A dealer, installer, or end user is typically unable to do this.

Therefore one problem with such remote sensors is that a range of functions or various working or operating parameters have so far been defined invariably or can only be changed in a very limited way, e.g. by coding devices on the remote sensors themselves, or by means of complex processes.

Maintenance of such remote sensors has so far also been possible only to a very limited extent, if at all.

It is therefore an object of the present invention to specify a remote sensor as well as a method that enables a simpler and more flexible configuration or maintenance of a remote sensor.

According to a first aspect, this object is solved by a remote sensor as explained below.

Such a remote sensor comprises a first wireless interface for sending out data. Further, the remote sensor comprises a second wireless interface arranged separately from the first wireless interface. The second wireless interface is configured for wireless transmission of information from an external device to the remote sensor and/or from the remote sensor to the external device.

Such a remote sensor enables easy configuration, maintenance or diagnosis of the functionality of the remote sensor or a system comprising such a remote sensor and receivers controlled thereby, such as gateways, actuators, receiving equipment, devices, (sub-)systems or combinations thereof by means of an external device that can be coupled to the second wireless interface of the remote sensor. Information or data can be easily transmitted from the external device to the remote sensor and/or from the remote sensor to the external device by means of the second wireless interface of the remote sensor.

In this way, a range of functions as well as working or operating parameters of the remote sensor can be defined during installation of the remote sensor or also subsequently flexibly, simply and extensively changed. Also (subsequent) software updates or software activations can be easily and cheaply performed wirelessly via the second wireless interface. Thus, the remote sensor enables simple and flexible configuration or maintenance via the second wireless interface. In this way, the remote sensor can also be flexibly adapted to different (possibly changed) operating situations or operating scenarios.

In various embodiments, the remote sensor, specifically the second wireless interface is implemented to receive and/or transmit data encrypted from/to the external device. This increases the security of a communication of the remote sensor with the external device via the second wireless interface.

In various embodiments, the remote sensor is configured to control one or more receivers, such as gateways, actuators, receiving devices, devices, systems, or combinations thereof. Such receivers may be, for example, devices and components of an automated building or home automation system, such as lamps, lights, displays, blinds, shutters, window actuators, electronic access or locking systems, air conditioning systems (in particular so-called Heating, Ventilation and Air Conditioning, (HVAC), etc.). In various embodiments, the remote sensor is arranged to be mobile and flexibly positioned.

In other embodiments, the remote sensor monitors physical environmental parameters in buildings, in industry or in nature and transmits corresponding measured values to the respective receivers. Examples of such environmental parameters include temperature, humidity, gas concentrations, water quality, air pressure, light intensity, water content, e.g. in soils, particle concentration in the air, etc.

In other embodiments, the remote sensor monitors parameters related to the condition of technical equipment and transmits corresponding measured values to the respective receivers. Examples are: material flow control in production, level measurement in containers, occupation status of rooms such as toilets or meeting rooms, security status of windows, doors, access barriers, occupation status of parking areas for vehicles, status of lighting systems, maintenance status of technical equipment and parts subject to wear, etc.

In various embodiments of the remote sensor, the second wireless interface is configured to wirelessly transmit energy from the external device to the remote sensor. This has the advantage that energy can be provided to the remote sensor via the second wireless interface, which is used to operate the remote sensor. This is very useful, for example, during configuration or maintenance by the external device using the second wireless interface. The remote sensor itself does not have to provide or expend any energy for this purpose. This is particularly advantageous for so-called energy-autonomous remote sensors with severely limited energy reserves. Configuration or maintenance can be easily performed with such remote sensors despite severely limited energy reserves because the energy required for this is provided via the second wireless interface.

In various embodiments of the remote sensor, operating the remote sensor means, for example, that the remote sensor is configured to be operated in an active operating state via energy that is transmitted to the remote sensor from the external device.

In various embodiments of the remote sensor, the second wireless interface is configured as a bidirectional data interface for wirelessly exchanging information between the remote sensor and the external device.

For example, the remote sensor is configured via the bidirectional data interface to transmit a response to the external device in response to a request from an external device transmitted to the remote sensor. Alternatively or additionally, the remote sensor is configured via the bidirectional data interface, for example, to transmit a request to the external device and thereupon to receive a response back from the external device. This has the advantage that not only information/data can be transferred from the external device to the remote sensor, but also information/data can be read out from the remote sensor by the external device. In this way, for example, maintenance data or a history of the reliability of the remote sensor can be collected. The bidirectional interface makes it possible to read out such data. Furthermore, a reliability or quality of the remote sensor during operation (e.g., link quality of a radio connection between the remote sensor and one or more receivers) can be exchanged and interrogated bidirectionally in this way.

In various embodiments of the remote sensor, the second wireless interface is configured as follows:
- as an inductive interface, in particular for near-field communication (range typically a few centimeters to a few meters) and/or
- as a radio interface and/or
- as an optical interface and/or
- as a capacitive interface and/or
- as an acoustic interface.

For example, the second wireless interface is configured as an inductive interface according to the so-called "Near Field Communication" or "NFC" standard. This enables good and reliable compatibility with external devices that also have a corresponding NFC interface. Alternatively or additionally, the second wireless interface is configured as a radio interface for the wireless exchange of information and/or energy via radio signals (radio frequency, RF). This enables communication even over greater distances. This is advantageous for very exposed locations and/or in industrial environments. Alternatively or additionally, the second wireless interface is configured as an optical interface for wireless exchange of information and/or energy via light. This is advantageous, for example, if interference or disturbance of radio signals must be avoided, e.g., in a laboratory environment or a place of use with highly regulated electromagnetic compatibility (EMC) requirements. Further alternatively or additionally, the second wireless interface is configured as an acoustic interface for wireless exchange of information and/or energy via acoustic signals, e.g. ultrasound.

In various embodiments of the remote sensor, the remote sensor comprises an energy converter for converting ambient energy, e.g. energy from the immediate environment, in particular mechanical energy or light energy or thermal energy, into electrical energy for operating the remote sensor. The remote sensor is thus configured as an energy-autonomous remote sensor. The remote sensor therefore does not require a cable connection for energy supply. Instead, the remote sensor obtains the energy it needs for measuring and transmitting data from the environment. The energy converter is, for example, an electromechanical or electrothermal energy converter or an energy converter that converts electromagnetic radiation from the visible or non-visible spectrum into electrical energy. Specifically, the energy converter is configured, for example, as a solar cell or Peltier element for converting light energy or thermal energy into electrical energy. In various embodiments, the remote sensor further comprises an energy storage device to store the electrical energy provided by the energy converter.

In this way, the remote sensor can be installed in locations without direct access to wired infrastructure and advantageously draws the energy required for operation from the immediate environment. This has the advantage of maintenance-free operation (from an energy supply point of view) without battery replacement or battery charging.

Alternatively or in addition to embodiments of the remote sensor with an energy converter, battery operation via one or more batteries is also possible.

In various embodiments of the remote sensor, the remote sensor can be configured or maintained via the second wireless interface such that a range of functions of the remote sensor and/or operating parameters of the remote sensor are influenced by means of one or more of the following measures: activation, deactivation, readout, modification. In this case, some or all of the functions and/or operating parameters of the remote sensor can be activated/stored in the remote sensor. These can be selected and/or activated via the external device by means of communication via the second wireless interface. Alternatively, new functions and/or operating parameters that are not yet stored in the remote sensor can also be loaded/programmed via the external device by means of communication via the second wireless interface. For this purpose, the remote sensor is connected, for example, with devices or controls for enabling or limiting or defining a certain range of functions or also certain working or operating parameters.

For example, an individual option or a combination of the following options can be set or provided:
- predefined working parameters such as radio frequencies, operating modes, communication standards, etc.,
- predefined safety levels,
- enabling or disabling of one, several or all predefined functions,
- enabling or disabling of one, several or all functions only conditionally or temporarily or permanently,
- programming of new functions, working or operating parameters not previously stored in the remote sensor.

The above object is solved according to a second aspect by a method explained below.

Such a method is set up for communication between a remote sensor and an external device and comprises the following steps:
- creating or setting up a communication link between a wireless interface of the remote sensor and a wireless interface of the external device, wherein the wireless interface of the remote sensor is arranged separately from a further wireless interface of the remote sensor for sending out data,
- transmitting information from the external device to the remote sensor and/or from the remote sensor to the external device by means of the established communication link.

By such a method, the same effects or advantages are achieved as explained above in connection with the remote sensor according to the first aspect.

In various implementations of the method, information or data is transmitted in encrypted form from the remote sensor to the external device or from the external device to the remote sensor. This increases the security of a communication of the remote sensor with the external device via the wireless interface configured for this purpose. Otherwise, the same effects or advantages are achieved as explained above in connection with the remote sensor according to the first aspect.

In various implementations, the method comprises the step of:

transferring energy from the external device to the remote switch using the wireless interface of the remote sensor.

This measure achieves the same effects or benefits as explained in connection with the remote sensor according to the first aspect above. This step may also be performed in the method at the beginning (initial) before the further steps explained above, or in parallel with these further steps.

In various implementations, the energy transmitted from the external device to the remote sensor is advantageously used to operate the remote sensor. Advantageously, the energy is transmitted by the external device during configuration or maintenance of the remote sensor.

In various implementations, the method comprises the step of:
configuring or maintaining the remote sensor by means of the external device in dependence on the transmitted information, wherein a range of functions of the remote sensor and/or operating parameters of the remote sensor are influenced by means of one or more of the following measures: activation, deactivation, readout, modification.

A desired configuration of the remote sensor is thereby advantageously stored in the external device. By establishing the communication link and exchanging information between the remote sensor and the external device by means of the established communication link, the desired configuration can be set in the remote sensor.

In various implementations of the method, a query/exchange between the external device and an online service (server) is provided. This includes, for example, authentication of the external device to the online service to verify appropriate rights of the external device to perform a configuration as explained above and/or to retrieve, pre-set or authorize a desired configuration of the remote sensor. A connection between the external device and the online service is advantageously encrypted for security reasons.

In various implementations of the method, the external device is connected to the online service and obtains a release for configuring or maintaining the remote sensor at the online service, whereby the configuration or maintenance of the remote sensor by the external device can only be performed if the release has been obtained at the online service. By these measures, configuration or maintenance of the remote sensor via the external device can only be performed if the configuration or maintenance or its range is enabled (authorized) via the online service.

In various implementations of the method, the online service specifies a range for configuring or maintaining the remote sensor, and the range for configuring or maintaining the remote sensor in the external device is authorized via the obtained release. For example, the external device first sends a request for configuration or maintenance of the remote sensor to the online service. The online service checks the request or a related range of a configuration or maintenance or whether the external device has the corresponding rights. For example, the online service checks, on the basis of a user account, whether certain configurations or settings of the remote sensor are activated in advance or have been acquired via a user of the external device. In this case, the online service authorizes the request or a related range of a configuration or maintenance that can then be performed on the remote sensor via the external device. If these mechanisms fail, configuration or maintenance of the remote sensor via the external device by the online service fails.

In various implementations, the method comprises the step of:
readout of identification information of the remote sensor by the external device, wherein configuring or maintaining the remote sensor is performed in response to the readout identification information. This has the advantage that the remote sensor is identified for the aforementioned measures and these measures are performed in dependence on such identification. Thus, a safe and error-free configuration or maintenance of the remote sensor is ensured.

In various implementations of the method, readout of the identification information of the remote sensor is performed by means of the communication link between the wireless interfaces of the remote sensor and the external device. Alternatively, readout of the identification information is performed via a separate path, such as by reading a QR code on the remote sensor via a sensor (such as a camera) of the external device.

In various implementations of the method, forwarding or checking of the identification information of the remote sensor is performed from the external device to an online service (server). This online service may be the online service mentioned above or another online service. A connection for this purpose between the external device and the online service is advantageously encrypted for security reasons.

In various implementations, the method comprises the steps of:
sending out a radio signal by the remote sensor to one or more receivers, initiated by the external device by means of the communication link,
receiving one or more return signals of the one or more receivers by the remote sensor,
storing a pairing of the remote sensor with the one or more receivers.

These measures allow a very simple pairing of the remote sensor with one or more receivers, controlled or initiated by the external device communicating with the remote sensor via the communication link and the wireless interface configured for this purpose. The sending out of the radio signal is performed, for example, via the further separate interface of the remote sensor. Storing the pairing is performed, for example, in the remote sensor or in the receiver and as an additional option in the external device.

In various implementations of the method, information is exchanged between the remote sensor and the external device bidirectionally via the communication link. This achieves the same effects or advantages as explained above in connection with the remote sensor according to the first aspect.

In various implementations, the method comprises the steps of:
sending out a radio signal by the remote sensor to one or more one or more receivers,
receiving one or more return signals from the one or more receivers by the remote sensor,
transmitting status information dependent on the received return signal(s) from the remote sensor to the external device by means of the communication link,
evaluating the transmitted status information by the external device.

These measures allow testing, configuration, maintenance or modification of an overall system comprising the remote sensor and one or more receivers, such as gateways, actuators, receiving devices, devices, systems or combinations thereof, which are controlled via the remote sensor. By means of the established communication link between the external device and the remote sensor, a transmission path between the remote sensor and one or more receivers can be checked and/or influenced. Thus, not only information/data concerning the remote sensor itself, but also information/data concerning the one or more receivers are generated and transmitted back from them to the remote sensor (triggered by the radio signal transmitted by the remote sensor). This retransmitted information/data is then transmitted to the external device via the wireless interface of the remote sensor configured for this purpose and can be evaluated and analyzed there. In these implementations, the sending out of radio signals from the remote sensor to the one or more receivers is also performed, for example, via the further separate interface of the remote sensor.

The above measures also have the advantage that checking of the transmission path between the remote sensor and the one or more receivers can be performed without the external device having to be coupled into a radio network (e.g., wireless local area network, WLAN, or Wifi) within which the remote sensor communicates with the one or more receivers. Rather, the remote sensor is an intermediary between the transmission link of the one or more receivers and the external device, whereby data is passed to the external device via the one or more receivers using the remote sensor and the arranged wireless interface. In this manner, checking of the transmission path between the remote sensor and the one or more receivers by means of the external device is very easily possible without having to allow an unknown external device access to a private wireless network.

Using the measures provided in these implementations, the following further steps are performed in more advanced implementations:
  predefining a defined range of functions and/or defined operating parameters by means of the external device, comprising a defined control of one or more receivers by the remote sensor,
  setting the defined range of functions and/or the defined operating parameters in the remote sensor,
  sending out the radio signal by the remote sensor to the one or more receivers depending on the defined range of functions and/or the defined operating parameters,
  storing a pairing of the remote sensor with the one or more receivers if the evaluated status information meets predetermined criteria.

By means of these additional measures, it is possible, alternatively or in addition to the above measures, to enable a particularly easy and advantageous assignment (pairing) of components and functions of several devices among each other in the system comprising the remote sensor and one or more receivers. This is controlled by the external device by means of the communication link established to the remote sensor. This is particularly useful during installation of the remote sensor, but also during maintenance and troubleshooting of the system.

The above object is solved according to a third aspect by an arrangement comprising a remote sensor and an external device according to the present disclosure. In particular, the arrangement is configured to perform a method according to the second aspect. In various embodiments of the arrangement, the remote sensor is advantageously set up as the remote sensor according to the first aspect. The external device is set up to communicate with the remote sensor.

The external device explained herein is, for example, a smartphone, tablet device, or smartwatch.

Any structural features, aspects, advantages and effects of the remote sensor according to the first aspect are reflected in method features, aspects, advantages and effects of the method according to the second aspect, and vice versa. The same applies between the arrangement according to the third aspect and the method according to the second aspect.

The invention is explained in more detail below with reference to embodiments with the aid of several drawings.

Figure 2:
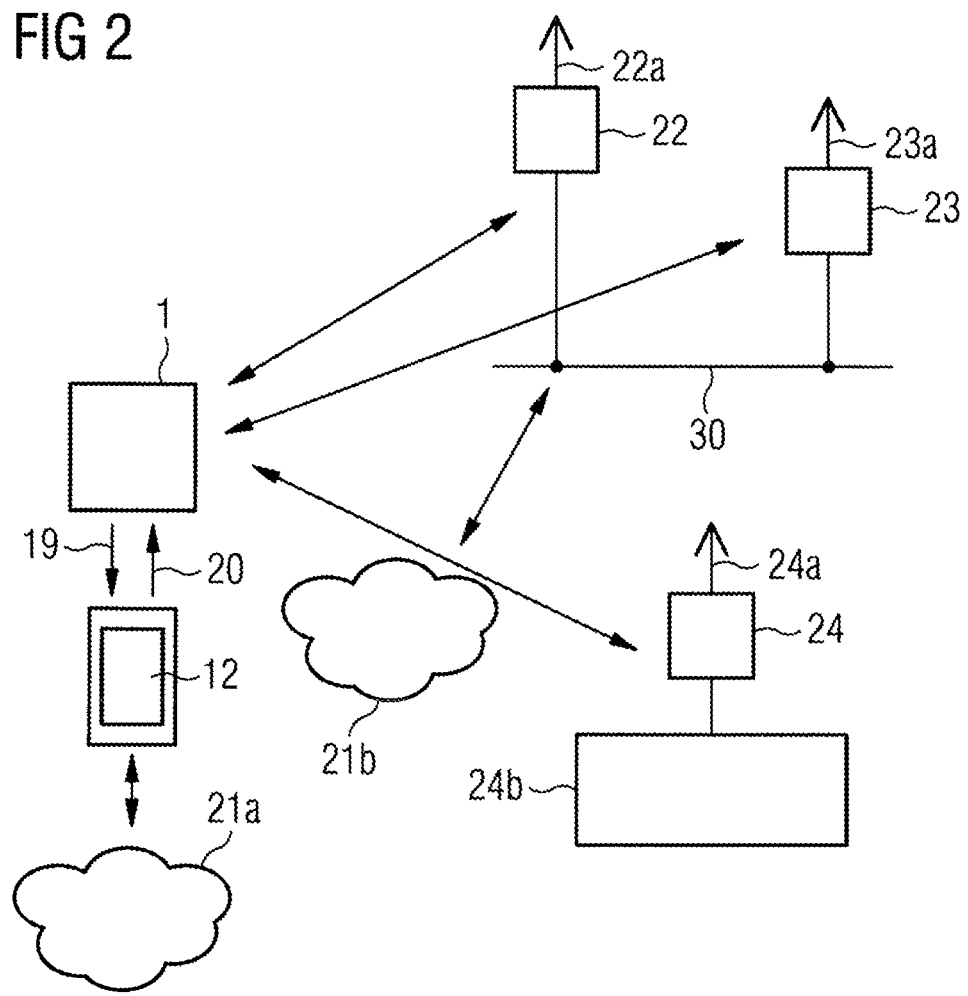
Figure 3:
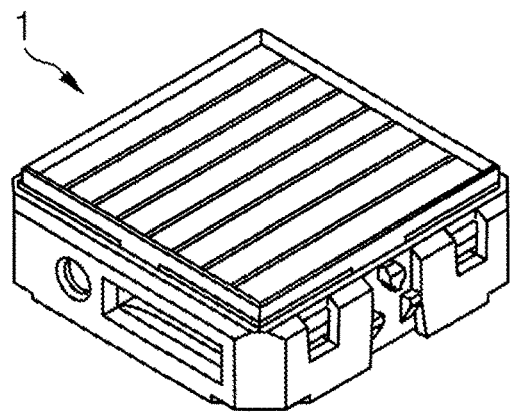
Figure 4:
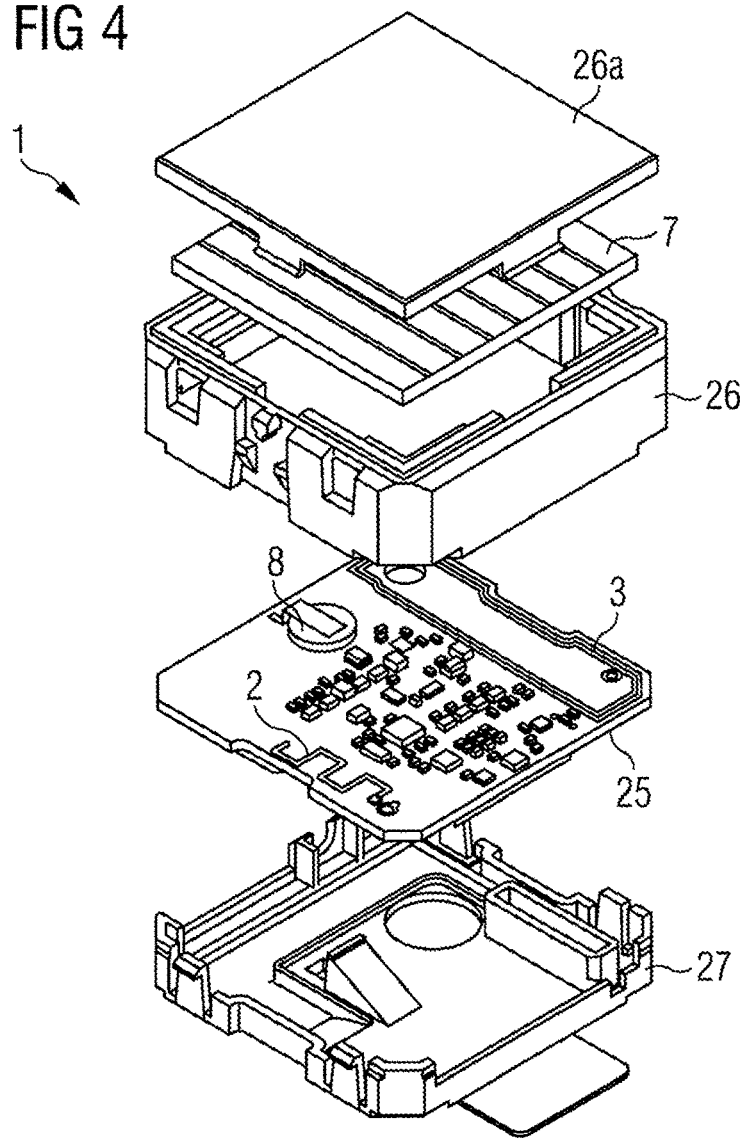

In the figures:

FIG. 1 a schematic representation of an exemplary embodiment of a remote sensor and an external device, FIG. 2 a schematic representation of an exemplary embodiment of a system with a remote sensor, an external device with online connection and several receivers, FIG. 3 a perspective view of an exemplary embodiment of the remote sensor, FIG. 4 an exploded view of the exemplary embodiment of the remote sensor according to FIG. 3, and FIG. 5 a schematic representation of an implementation of a method for configuring a remote sensor.

FIG. 1 shows a schematic representation of an embodiment of a remote sensor 1 and of an external device 12.

In this embodiment, the remote sensor 1 is realized as an energy-autonomous remote sensor 1. The remote sensor 1 has an energy converter 7. This energy converter 7 converts non-electrical ambient energy into electrical energy. Non-electrical forms of ambient energy include, in particular, light energy, mechanical energy, thermal energy, alternating electric or magnetic fields and electromagnetic radiation. The energy converter 7 is realized, for example, as a solar cell or thermoelectric converter or as a piezoelectric or electromagnetic converter for converting mechanical energy. Furthermore, the remote sensor 1 has an energy management unit 6. This energy management unit 6, preferably implemented as an electronic circuit, performs all or some of the following features:
  charging an energy storage device 8, which may be, for example, a capacitor and/or a chemical energy storage device, with the charges provided by the energy converter 7,
  controlling the energy storage by avoiding overvoltages to protect the energy storage device 8,
  controlling the energy consumption of the remote sensor 1 by possibly necessary disconnection of all loads or by reducing the consumption currents in case of undervoltage to protect the energy storage 8,
  providing backup energy by an electrochemical battery in the case of weak ambient energy, preferably using lithium technology, by switching thereto if necessary,
  controlling the voltage (via an optional voltage converter 9) output by the energy management unit 6 for the operation of the remote sensor 1 to the range accepted for the operation of the electrically downstream components.

In this way, the remote sensor 1 is energy self-sufficient, with the electrical energy required for operation being provided from the environment. The remote sensor 1 is thus flexible and mobile for use at different locations or in different application scenarios.

Furthermore, in the embodiment according to FIG. 1, the remote sensor 1 has a microcontroller or a central processing unit 11 and a non-volatile memory 10. The non-volatile memory 10 stores, for example, data, in particular program data or software. This information is processed by the microcontroller 11. In general, the microcontroller 11 is configured to control the remote sensor 1 for intended use.

Furthermore, the remote sensor 1 has one or more measurement sensors 29, which measure measurement data of physical parameters from the immediate environment (up to a few meters) and make them available to the microcontroller 11. Examples of measured variables are air temperature, air humidity, distance to objects in the vicinity, gas concentrations, magnetic fields, accelerations, thermal radiation, soil moisture, air humidity, number of particles in the air, presence of objects and much more.

In the embodiment according to FIG. 1, the remote sensor 1 has two separate wireless interfaces 2 and 3. The first wireless interface 2 is a radio interface, whereby radio signals can be transmitted by the remote sensor 1 via an antenna 4. Such radio signals are used, for example, to control one or more receivers that communicate with the remote sensor 1 via a radio link. Such communication takes place, for example, within a WLAN network, a Bluetooth network, an EnOcean network, a Zigbee network or via other radio standards for short to medium ranges.

The second wireless interface 3 is, for example, an NFC interface, wherein a wireless communication link can be established between the remote sensor 1 and the external device 12 via the antenna 5, whereby information or data 19 and/or energy 20 is exchanged between the remote sensor 1 and the external device 12.

The external device 12 has a corresponding wireless interface 14 with an antenna 16 for wireless communication with the remote sensor 1, via which a corresponding wireless communication link can be established with the interface 3 (antenna 5) of the remote sensor 1.

In the constellation according to FIG. 1, for example, a bidirectional exchange of information/data 19 takes place between the remote sensor 1 and the external device 12 by means of the respective wireless interface 3 on the side of the 30 remote sensor 1 and the wireless interface 14 on the side of the external device 12. Furthermore, the external device 12 provides energy 20 to the remote sensor 1 via this wireless connection. This energy supply is advantageous in enabling the wireless sensor 1 to operate independently of its own energy supply, as explained above, at least for configuration purposes. The energy 20 is transmitted from the external device 12 to the remote sensor 1 via the respective wireless interfaces 3 and 14.

Moreover, the external device 12 further comprises a user interface 13, for example a touch-sensitive display, a battery 18 for supplying energy to the external device 12, a microcontroller or central processing unit 28 for controlling the external device 12, and a further wireless interface 15 with an antenna 17 arranged, for example, as a radio interface. In this way, the external device 12 can also be used in a mobile manner and can be integrated into any radio networks, for example into a WLAN. The external device 12 is, for example, a mobile device such as a smartphone, tablet device or smartwatch.

FIG. 2 shows a schematic representation of an embodiment of a system with a remote sensor 1, an external device 12 with online connection to an online service 21a as well as with several receivers 22, 23 and 24, which can be addressed or controlled via the remote sensor 1. The remote sensor 1 or the external device 12 according to the exemplary embodiment in FIG. 2 are, for example, set up according to the configuration of the embodiment of FIG. 1.

The receivers 22 and 23 are, for example, gateways and/or other transmitting/receiving devices. Alternatively or additionally, the receivers 22 and 23 are actuators, devices or entire systems with corresponding transmit/receive functionality. The receivers 22 and 23 are connected to a network or a databus 30 and can communicate with each other or with further (not shown) bus participants by this means. The network or databus 30 is optionally connected to an online service 21b. In the embodiment example according to FIG. 2 this differs from the online service 21a and provides, for example, an online database for communication or operating data of the wireless sensor 1 and/or the receivers 22 and 23. Alternatively, the online services 21a and 21b are integrated in a provided service.

The receiver 24 is, for example, a gateway and/or other transmitting/receiving device and communicatively connected to a component 24b. The component 24b represents, for example, an actuator of a device or system, e.g., a HVAC system, or is itself such a device or system.

The receivers 22, 23 and 24 have antennas 22a, 23a and 24a as corresponding transmitting/receiving devices. The remote sensor 1 can communicate bidirectionally with the receivers 22, 23 and 24 via its radio interface 2 and antenna 4 (compare FIG. 1). In particular the remote sensor can send control signals to the receivers 22, 23 and 24, or optionally it can send corresponding return signals (for example status signals) from the receivers 22, 23 and 24, respectively.

The external device 12 communicates with the remote sensor 1, as has been explained in connection with FIG. 1, i.e. in particular via a wireless interface within the remote sensor 1 (e.g. interface 3 according to FIG. 1) and via a corresponding wireless interface in the external device 12 (e.g. the interface 14 according to FIG. 1). In the implementation in FIG. 2, the remote sensor 1 and the external device 12 are configured to exchange information and data 19, respectively, bidirectionally via the corresponding wireless interfaces 3 and 14. Further, the external device 12 is configured to provide electrical energy 20 from the external device 12 to the remote sensor 1 via the respective wireless interfaces 3 and 14.

The external device 12 is connected to the online service 21a via a separate wireless radio interface (for example, the interface 15 shown in FIG. 1). The online service 21a is, for example, a service provided via a server for authentication of the external device 12 or the remote sensor 1. Alternatively or additionally, the online service 21a is used to specify a range of functions or operating parameters or working parameters of the remote sensor 1 or a permitted range of a configuration or maintenance of the remote sensor 1, depending on which the remote sensor 1 can be configured. For example, the online service 21a is set up to authorize or enable the permitted range of a configuration or maintenance of the remote sensor 1 in the external device 12. A corresponding functionality or method for configuring the remote sensor 1 by means of the external device 12 starting from the system as shown in FIG. 2 is explained in more detail in connection with a method according to FIG. 5 below.

In the system as shown in FIG. 2, the external device 12 is optionally equipped with a sensor system to collect additional information about the remote sensor 1. Such additional information is, for example, identification information of the remote sensor 1. The sensor system on the external device 12 is, for example, a camera of the external device 12. For example, a marker on the remote sensor 1, for example a so-called QR code, is optically detected via the camera of the external device 12. This marker contains, for example, identification information of the remote sensor 1, which can be processed accordingly after scanning of the marker by the external device 12. Optionally, detected identification information of the remote sensor 1 can be sent to the online service 21a via the external device 12 to be checked or verified there.

Preferably, in the implementation according to FIG. 2, one or more communication links between the remote sensor 1 and the receivers 22, 23 and 24, between the receivers 22, 23 and the databus 30 or online service 21b, between the remote sensor 1 and the external device 12 or between the external device 12 and the online service 21a are encrypted.

FIG. 3 shows a perspective view of a further exemplary embodiment of a remote sensor 1 as it can be applied in FIGS. 1 and 2, for example.

FIG. 4 shows an exploded view of the embodiment of the remote sensor 1 according to FIG. 3, wherein individual components of the remote sensor 1 are illustrated. In particular, the remote sensor 1 according to FIG. 4 has an upper housing part 26 and a lower housing part 27. The upper housing part 26 comprises a cover 26a for an energy converter 7.

The lower housing part 27 serves to accommodate the other components of the remote sensor 1. In particular, a circuit board 25 is mounted between the upper housing part 26 and the lower housing part 27, which comprises all electrical or electronic components of the remote sensor 1 (apart from the energy converter 7). In particular, according to FIG. 4, the first wireless interface 2 is arranged on the circuit board 25, which is, for example, a radio interface analogous to the implementation of FIG. 1. Furthermore, the second wireless interface 3 is arranged on the circuit board 25, which is, for example, an NFC interface analogous to the implementation according to FIG. 1. Furthermore, an energy storage device 8 is arranged on the circuit board 25, which can store the electrical energy from the energy converter 7, which is exemplarily implemented here as a solar cell.

FIG. 5 shows a schematic representation of an implementation of a method for configuring a remote sensor with several method steps S1 to S9. In the following, such a method for configuring the remote sensor 1 in a system according to the exemplary implementation of FIG. 2 is explained in more detail. All subsequent explanations structurally refer to the exemplary implementation of FIG. 2, with various method steps of a method being explained in various exemplary implementations according to FIG. 5.

As explained above, the external device 12 is battery-operated (battery 18) with user interface 13 and enables bidirectional communication 19 with the remote sensor 1 and energy transmission 20 to the remote sensor 1. The communication link between the external device 12 and the remote sensor 1 is established via wireless interfaces 3 and 14 (see FIG. 1) with a short range, typically up to a few meters. The external device 12 has access to the online service 21a to exchange data and/or permissions/authorizations to perform actions related to a configuration of the remote sensor 1 with the online service 21a when in use or time-deferred. A communication link between the remote sensor 1 and the external device 12 or between the external device 12 and the online service 21a is preferably established by means of secured (encrypted) communication.

1) Example of Implementation of a Method According to FIG. 5 for the Configuration Procedure of Functions of the Remote Sensor 1 According to FIG. 2.

In a step S1, a set of predefined functions of the remote sensor 1 is selected on the external device 12. In an optional step S2, a release (rights to make this change) is obtained for this purpose via the connection to the online service 21a, either by obtaining a release for the individual remote sensor 1 (e.g., via identification information of the remote sensor 1 detected by the device 12), or by obtaining a limited-use release for all remote sensors of a type, e.g., "remote sensor with properties xyz". For example, in the online service 21a for this purpose, an account linked to the external device 12 is checked whether corresponding rights have been activated or acquired, e.g., whether a certain range of functions or certain configurations of the remote sensor 1 have been enabled, e.g. by purchase.

In a further step S3, the device 12 is brought in proximity with the remote sensor 1. In a step S4, the wireless interface (interface 14 according to FIG. 1) of the device 12 supplies electrical energy to the remote sensor 1. In a step S5, a communication link is initiated between the wireless interface of the device 12 and the wireless interface (interface 3 according to FIG. 1) of the remote sensor 1.

In a step S6, the transmission of the set of predefined functions to the remote sensor 1 is initiated manually or automatically. As soon as the set of predefined functions has been transmitted to the remote sensor 1, in step S7 the configuration of the functions of the remote sensor 1 is performed based on the set of predefined functions. In an optional step S8, after completion of the configuration of the remote sensor 1, which is communicated to the device 12 for example via a corresponding return signal from the remote sensor 1, the set configuration of the remote sensor 1 is checked by the device 12. This is done, for example, by sending test data from the device 12 to the remote sensor.

In an optional final step S9, after the configuration of the remote sensor 1 is completed, this configuration is stored in the device 12 and/or in the online service 21a in a manner that can be uniquely assigned (e.g., via an identification number of the remote sensor 1).

2) Exemplary Implementation of a Method According to FIG. 5 for the Procedure for Assigning the Remote Sensor 1 to One or More Receivers 22, 23 or 24 in the System According to FIG. 2.

In a step S1, the device 12 is brought in proximity to the remote sensor 1. In a step S2, the wireless interface (interface 14 according to FIG. 1) of the device 12 supplies the remote sensor 1 with electrical energy. In a step S3, a communication link is initiated between the wireless interface of the device 12 and the wireless interface (interface 3 according to FIG. 1) of the remote sensor 1.

In a step S4, identification information of the remote sensor 1 is interrogated via its wireless interface (see interface 3 of FIG. 1). Alternatively or additionally, a QR code of the remote sensor 1 is read, which is interrogated by a camera of the device 12.

Preferably, the device 12 has information as to which of the receivers 22, 23 or 24 the remote sensor 1 is to be assigned (one or more receivers 22, 23 or 24). In a step S5, a defined range of functions and/or defined operating parameters are optionally specified by means of the external device 12, which comprise a defined communication of the remote sensor 1 with one or more of the receivers 22, 23 or 24. Thereby, optionally, the defined range of functions and/or the defined operating parameters are arranged in the remote sensor 1. For example, the defined range of functions and/or the defined operating parameters are specified by the online service 21a, analogously to the 1) exemplary implementation.

In a further step S6, the remote sensor 1 is optionally initiated to transmit a wireless signal to the receiver(s) 22, 23 or 24, optionally using the energy 20 supplied via the interface 30.

In a further step S7, the remote sensor 1 is optionally switched to a receive mode to receive a return acknowledgement (return signal, acknowledge signal) of the reception of its radio signal transmitted in step S6 by the receiver(s) 22, 23 or 24. This acknowledgement is qualitatively evaluated according to signal strength and correctness, e.g. by means of identifiers (identification information) of the receiver(s) 22, 23 or 24). This determines whether the correct receiver or receivers 22, 23 or 24 are being controlled with the desired functionality.

Steps S6 and S7 may also be performed iteratively for a plurality of the receivers 22, 23, or 24.

In an optional step S8, status information is transmitted depending on the received acknowledgement(s) from the remote sensor 1 to the external device 12 by means of the communication link, and the transmitted status information is evaluated by the external device 12.

In a final step S9, after successful communication between the remote sensor 1 and a corresponding receiver 22, 23 or 24, this pairing is permanently stored, preferably in the respective receivers 22, 23 or 24, optionally also in the remote sensor 1 and/or in the external device 12 and/or in the online service 21*a* or online service 21*b*. Thus, an assignment has been fixed and optionally also the quality of the radio link has been checked.

The advantage of these measures is that there is no need for the device 12 to access a radio network or a radio connection between the remote sensor 1 and the receivers 22, 23 or 24, in order to assign and check a pairing between the remote sensor 1 and one or more of the receivers 22, 23 or 24. Rather, information is exchanged thereon between the remote sensor 1 and the device 12 via the wireless communication link between these components of the system. In this way, the system can be configured or maintained without having to grant a user of the device 12 access to the wireless network or a wireless link between the remote sensor 1 and receivers 22, 23 or 24. This increases the level of security. 3) Exemplary implementation of a method according to FIG. 5 for troubleshooting, maintenance or quality assurance in the system with the remote sensor 1 and the receivers 22, 23 or 24 according to FIG. 2.

In case of malfunction of the remote sensor 1 or one or more of the receivers 22, 23 or 24, a comprehensive diagnosis can be easily performed with the mobile device 12.

In a step S1, the device 12 is brought in proximity to the remote sensor 1. In a step S2, the wireless interface (interface 14 according to FIG. 1) of the device 12 supplies the remote sensor 1 with electrical energy. In a step S3, a communication link is initiated between the wireless interface of the device 12 and the wireless interface (interface 3 according to FIG. 1) of the remote sensor 1.

In a step S4, the sending of a radio telegram out of the remote sensor 1 to one or more of the receivers 22, 23 or 24 is initialized by the device 12. In a step S5, a reaction of the one or more receivers 22, 23 or 24 is checked. In a step S6, a switching of the remote sensor 1 to the receive mode and an evaluation of acknowledge signals of the one or more receivers 22, 23 or 24 is performed. In a step S7, a readout of a history of the radio connection between the remote sensor 1 and the one or more receivers 22, 23 or 24 by means of the wireless communication link is performed by the device 12 and optionally an evaluation of the readout information is performed. Optionally, a readout of an error memory of the remote sensor 1 is performed by the device 12 and optionally an evaluation of this readout information is performed. In an optional further step S8, error elimination measures are initiated and performed, e.g. by means of a software update or a reconfiguration of the remote sensor 1 by the device 12 according to the measures explained above. In a final optional step S9, a recommendation of other repair measures is made by the device 12, e.g. a hardware replacement of the remote sensor 1.

All embodiments and/or implementations described are selected merely by way of example.

LIST OF REFERENCE SIGNS 1 remote sensor
2 first wireless interface
3 second wireless interface
4 antenna
5 antenna
6 energy management unit
7 energy converter
8 energy storage
9 voltage converter
10 non-volatile memory
11 Microcontroller, central processing unit
12 external device
13 user interface
14 first wireless interface
15 second wireless interface
16 antenna
17 antenna
18 battery
19 information, data
20 energy
21*a*, 21*b* online service
22 receiver or transceiver
23 Receiver or transceiver
24 Receiver or transceiver
22*a* antenna
23*a* antenna
24*a* antenna
24*b* actuator
25 circuit board
26 upper housing part
26*a* cover
27 lower housing part
28 microcontroller, central processing unit
29 sensor
30 databus
S1 to S9 method steps

The invention claimed is:

1. A remote sensor comprising:
a first wireless interface for sending out data and a second wireless interface arranged separately from the first wireless interface, the second wireless interface configured for wirelessly transmitting information (i) from an external device to the remote sensor, and/or (ii) from the remote sensor to the external device,
an energy converter for converting ambient energy into electrical energy, and
wherein the second wireless interface is further configured for wirelessly transmitting energy from the external device to the remote sensor during configuration or maintenance of the remote sensor by the external device, wherein the wirelessly transmitted energy is used for operating the remote sensor for communicating via the first wireless interface, and wherein the remote sensor is provided with an energy management unit for controlling energy consumption of the remote sensor and providing backup energy by a battery.

2. The remote sensor according to claim 1, wherein the second wireless interface is configured as a bidirectional data interface for wireless exchange of information between the remote sensor and the external device.

3. The remote sensor according to claim 1, wherein the second wireless interface is configured as follows:
as an inductive interface, in particular for near-field communication and/or
as a radio interface and/or as an optical interface and/or as a capacitive interface.

4. The remote sensor according to claim 1, wherein the energy converter is adapted for converting mechanical energy, light energy or thermal energy, into electrical energy for operating the remote sensor.

5. The remote sensor according to claim 1, wherein the remote sensor can be configured or maintained via the second wireless interface in such a way that a range of functions of the remote sensor and/or operating parameters of the remote sensor are influenced by one or more of the following measures:
- activation,
- deactivation,
- readout,
- modification.

6. A method of communication between a remote sensor and an external device, the remote sensor including a first wireless interface for sending data, the method comprising:
- transferring energy from the external device to the remote sensor during configuration or maintenance of the remote sensor by the external device by a second wireless interface of the remote sensor, wherein the energy is used for operating the remote sensor,
- creating a communication link between the second wireless interface of the remote sensor and a wireless interface of the external device, wherein the second wireless interface of the remote sensor is arranged separately from the first wireless interface of the remote sensor for sending out data by using the energy received energy from the external device via the second wireless interface,
- controlling energy consumption of the remote sensor by use of an energy management unit, the energy management unit providing backup energy by a battery, and
- transmitting information (i) from the external device to the remote sensor and/or (ii) from the remote sensor to the external device by the established communication link.

7. The method according to claim 6, comprising the step of:
- configuring or maintaining the remote sensor by the external device depending on the transmitted information, wherein a range of functions of the remote sensor and/or operating parameters of the remote sensor are influenced by one or more of the following measures:
  - activation,
  - deactivation,
  - readout,
  - modification.

8. The method according to claim 7, wherein the external device is connected to an online service and obtains a release to configure or maintain the remote sensor at the online service,
- wherein the configuration or maintenance of the remote sensor by the external device can only be performed if the release has been obtained at the online service.

9. The method according to claim 8, wherein the online service specifies a certain range for configuring or maintaining the remote sensor and the range for configuring or maintaining the remote sensor is authorized in the external device via the obtained release.

10. The method according to claim 6, comprising the steps of:
- sending out a radio signal by the remote sensor to one or more receivers initiated by the external device by the communication link,
- receiving one or more return signals of the one or more receivers by the remote sensor,
- storing a pairing of the remote sensor with the one or more receivers.

11. The method according to claim 6, wherein information is exchanged between the remote sensor and the external device bidirectionally via the communication link.

12. The method according to claim 11, comprising the steps of:
- sending out a radio signal by the remote sensor to one or more receivers,
- receiving one or more return signals from the one or more receivers by the remote sensor,
- transmitting status information depending on the received return signal(s) from the remote sensor to the external device by the communication link,
- evaluating the transmitted status information by the external device.

13. An arrangement configured to perform the method of claim 6, the arrangement comprising a remote sensor and an external device.

14. A method of communication between a remote sensor and an external device, comprising:
- transferring energy from the external device to the remote sensor during configuration or maintenance of the remote sensor by the external device by a wireless interface of the remote sensor, wherein the energy is used for operating the remote sensor;
- creating a communication link between the wireless interface of the remote sensor and a wireless interface of the external device, wherein the wireless interface of the remote sensor is arranged separately from a further wireless interface of the remote sensor for sending out data;
- transmitting information (i) from the external device to the remote sensor and/or (ii) from the remote sensor to the external device by the established communication link;
- configuring or maintaining the remote sensor by the external device depending on the transmitted information, wherein a range of functions of the remote sensor and/or operating parameters of the remote sensor are influenced by one or more of activation, deactivation, readout, and modification;
- and wherein the external device is connected to an online service and obtains a release for the configuring or the maintaining of the remote sensor at the online service, the configuring or the maintaining of the remote sensor by the external device is only performed if the release has been obtained at the online service.

15. The method according to claim 14, wherein the online service specifies a certain range for the configuring or the maintaining of the remote sensor, the range for the configuring or the maintaining of the remote sensor is authorized in the external device via the obtained release.

* * * * *